United States Patent [19]
Crews

[11] Patent Number: 5,017,030
[45] Date of Patent: May 21, 1991

[54] ERGONOMICALLY DESIGNED KEYBOARD

[76] Inventor: Jay A. Crews, 721 Johnson Ave., San Luis Obispo, Calif. 93401

[21] Appl. No.: 882,633

[22] Filed: Jul. 7, 1986

[51] Int. Cl.$^5$ .............................................. B41J 5/10
[52] U.S. Cl. .................... 400/485; 400/476; 400/489; 400/715
[58] Field of Search .............. 400/54, 100, 472, 476, 400/485, 489, 715

[56] References Cited

U.S. PATENT DOCUMENTS

| | | | |
|---|---|---|---|
| 1,336,151 | 4/1920 | O'Connor | 400/475 |
| 1,492,548 | 4/1924 | Davies | 400/364 |
| 1,652,464 | 12/1927 | Tyberg | 400/489 |
| 3,870,738 | 3/1975 | Sato et al. | 400/54 |
| 3,929,216 | 12/1975 | Einbinder | 400/484 |
| 3,945,482 | 3/1976 | Einbinder | 400/486 |
| 4,042,777 | 8/1977 | Bequaert et al. | 400/100 X |
| 4,081,068 | 3/1978 | Zapp | 400/489 X |
| 4,201,489 | 5/1980 | Zapp | 400/485 |
| 4,244,659 | 1/1981 | Malt | 400/486 |
| 4,333,097 | 6/1982 | Buric et al. | 340/711 |
| 4,381,502 | 4/1983 | Prame | 400/485 X |
| 4,655,621 | 4/1987 | Holden | 400/489 X |

FOREIGN PATENT DOCUMENTS

| | | | |
|---|---|---|---|
| 67069 | 4/1984 | Japan | 400/715 |
| 651504 | 9/1985 | Switzerland | 400/485 |
| 2076743 | 12/1981 | United Kingdom | 400/489 |
| 8102272 | 8/1981 | World Int. Prop. O. | 400/489 |

OTHER PUBLICATIONS

IBM Tech. Disc. Bulletin, "Single-Key Cursor Control", Truelson, vol. 26, No. 7B, Dec. 1983, pp. 3746–3747.
IBM Tech. Disc. Bulletin, vol. 27, No. 10A, Mar. 1985, "Compact Computer Keyboard", pp. 5640–5642.
IBM Tech. Disc. Bulletin, "Smart Key", vol. 28, No. 5, Oct. 1985, pp. 1859–1860.
Stuckert, "Input Keyboard," IBM Tech. Disclosure Bulletin, vol. 14, No. 3, 8/71, pp. 952–959.
Conway, "Digital X Typewriter Keyboard," IBM Tech. Disclosure Bulletin, vol. 18, No. 12, 5/76, pp. 4187–4190.
Bacon, "Easy-To-Learn Programmable Keyboard," IBM Tech. Disclosure Bulletin, vol. 24, No. 5, 10/81, p. 2465.
Bequaert, "Portable High Speed Keyboard," IBM Tech. Disclosure Bulletin, vol. 23, No. 7A, 12/80, pp. 3016–3018.

Primary Examiner—Clifford D. Crowder
Attorney, Agent, or Firm—Daniel C. McKown

[57] ABSTRACT

A keyboard usable on a typewriter or a computer terminal and configured in accordance with ergonomic principles uses chording of one thumb and one finger to type the characters of the English alphabet. The keyboard includes right and left preloaded palm pads which are shaped and contoured to fit the hands. The palm pads support the hands and operate the SHIFT and SHIFT LOCK functions. The punctuation keys are not affected by the SHIFT function. Movement of the writing position or cursor with respect to the medium is controlled by thumb-operated keys which are pushed in the direction of the desired movement.

35 Claims, 4 Drawing Sheets

ERGONOMICALLY DESIGNED KEYBOARD

BACKGROUND OF THE INVENTION

1. Field of the Invention

The present invention is in the field of data processing, and more specifically relates to a keyboard for data entry. The keyboard of the present invention converts the actuation of its various keys to electrical signals; it is not a part of any particular machine. However, it can be electrically connected to a typewriter, word processor, printer, computer or other device so that its electrical signals can be utilized to control the operation of such other devices.

2. The Prior Art

A detailed discussion of the prior art is contained in a Prior Art Statement that has been lodged in the Patent Office file of this application. Accordingly, only an abbreviated discussion will be presented here.

In one aspect of the present invention, the SHIFT key assigns alternative characters to only the character keys and not to the punctuation keys. In the prior art, it was common for the SHIFT key to affect all of the keys on the keyboard and to assign alternative characters to the punctuation keys.

Typically, the punctuation keys are located at some distance from the home keys, and most users find it difficult to strike the desired punctuation key with confidence. The present inventor recognized that the location of the punctuation keys imposes a burden on the user and that this burden should not be increased by adding the complication that the punctuation key has two alternative characters. In the present invention, each punctuation key includes only one character which remains unchanged regardless which mode the keyboard is in.

In another aspect of the invention, palm pads are provided and they serve both as hand rests and as operational keys. Two types of hand rest are known in the prior art. One kind is simply an actuator which is not intended to support a substantial part of the weight of the hand, but instead is pushed by the hand to effect some function. Another type of hand rest known in the prior art serves only to space the fingers from the proximity-actuated keys to avoid accidentally operating the keys. None of the hand rests found in the prior art are specifically shaped and contoured to fit the shape of the hand of the user, as is the case in the present invention.

In another aspect of the present invention, special keys are provided for the purpose of selectively altering the location of the writing position or cursor. These four keys are used respectively for controlling the motion of the cursor or writing position relative to the medium in the four directions: left, right, up, and down. Each of these keys is slidable in the direction that the key controls. No comparable cursor control system is known in the art.

In a fourth aspect of the invention, the palm pads that also serve as hand rests are used for operating the SHIFT. One earlier patent shows a shift key located under the palm of the left hand, but it is not usable by both hands and includes no provision for shift lock.

In a fifth aspect of the present invention a system of chording is used to input the 26 different characters of the English alphabet. Although chording has been used in some prior art keyboards, the particular scheme of chording used in the present invention is thought to be unique.

Thus, it appears that the present invention has a number of novel features which are not disclosed in the prior art. In the following section, these features will be discussed in greater detail.

SUMMARY OF THE INVENTION

The keyboard of the present invention makes maximum use of ergonomic principles to provide a keyboard that is uniquely efficient to use and easy to learn. This consistent application of ergonomic principles can be seen in each of the various aspects of the present invention.

A unique system of chording permits the fingers and thumbs to remain on the home keys for all the letters and numerals.

The punctuation keys are located immediately beyond the tips of the fingers in their home position, and the characters produced by the punctuation keys are not altered by shifting from lower case to upper case letters. This location of the punctuation keys assures that they will remain visible at all times (except when being struck).

A left palm pad and a right palm pad are provided and serve the dual purposes of supporting the hands and of serving as SHIFT keys. The surface of the palm pad is shaped and contoured to fit the proximal portion of the palm of the hand, so that the hand is supported comfortably and in a natural position.

The keyboard also includes four keys that, in addition to being depressable, are slidable in the plane of the face of the keyboard. Each of these four keys controls the motion of the writing position or cursor with respect to the medium in one of the four directions: left, right, up, and down. The direction in which the key is slid corresponds to the direction of motion of the writing position or cursor (with one exception).

When depressed, two of the four keys effect the TAB LEFT and the TAB RIGHT functions.

The remaining two of the four keys may be used, by depressing one and sliding the other, to effect the ERASE LEFT and ERASE RIGHT functions. The requirement that two keys be used simultaneously to activate these functions guards against accidental erasure.

In accordance with the present invention, the thumb, being the strongest and most versatile digit, is given the greatest individual workload, in contrast to conventional keyboards. The individual fingers leave their home positions only when it is necessary to strike a punctuation key. Even then, only one finger at a time is away from the home keys.

In designing the present keyboard, the inventor started with the hands themselves, in a natural, comfortable and highly functional position. Thereafter, a key and control layout was built up around the hands, taking into account their unique form and function, capitalizing on their strengths and avoiding their weaknesses. The resulting keyboard of the present invention is therefore uniquely natural and efficient, and quite easy to learn.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
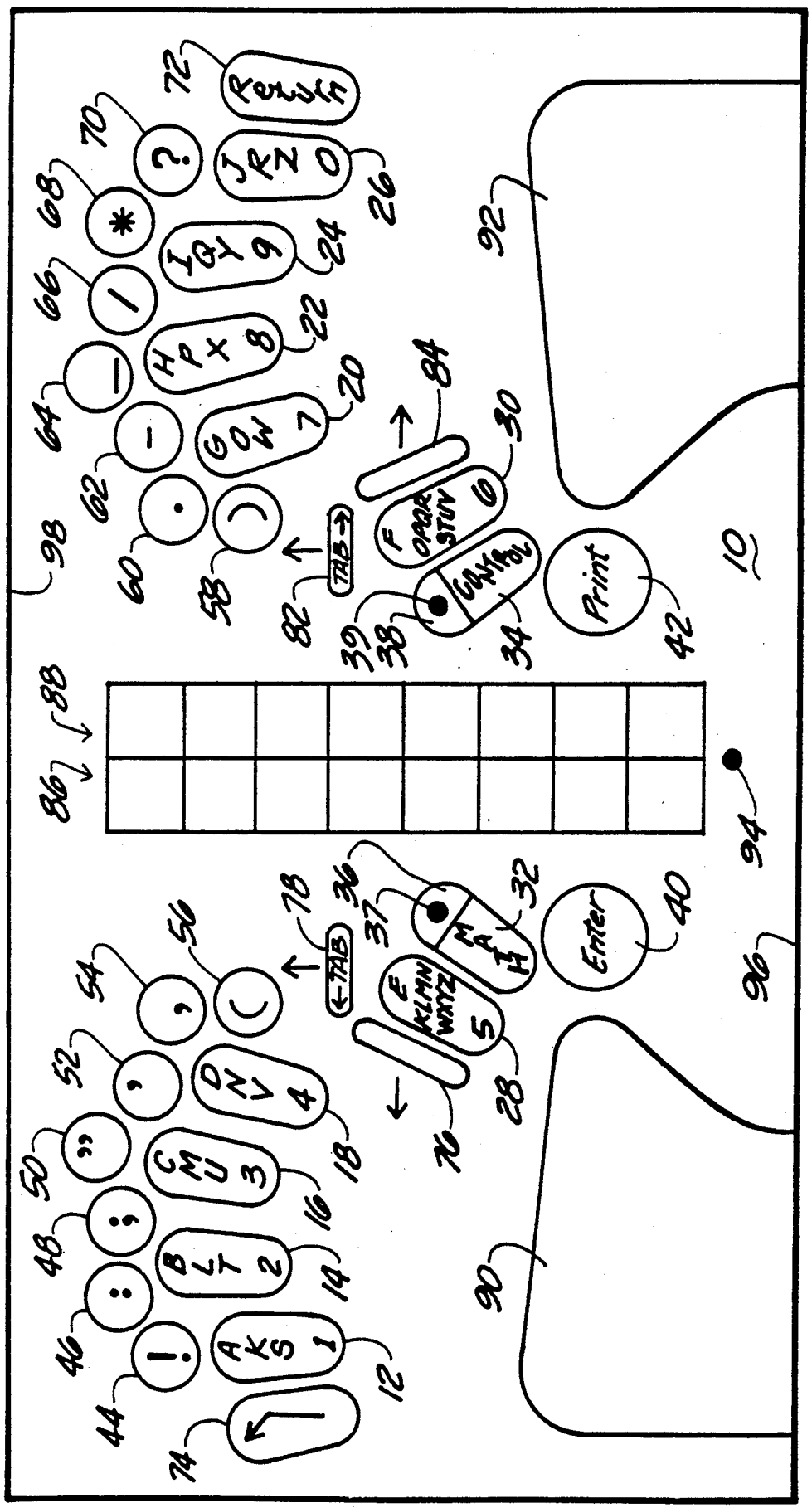
FIG. 1 is a diagram of the face of the keyboard showing the layout of the keys and control buttons in a preferred embodiment of the invention.
Figure 2:
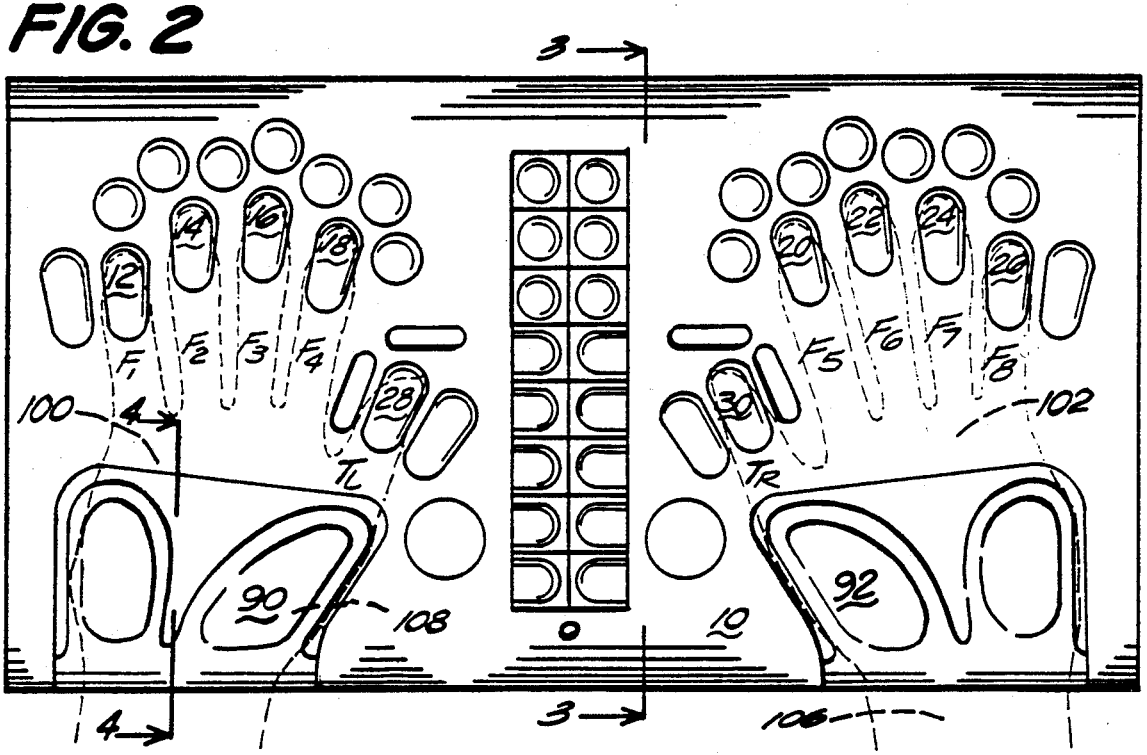
FIG. 2 is a plan view in the plane of the face of the keyboard showing the home position of the hands and fingers when the keyboard is in use.
Figure 3:
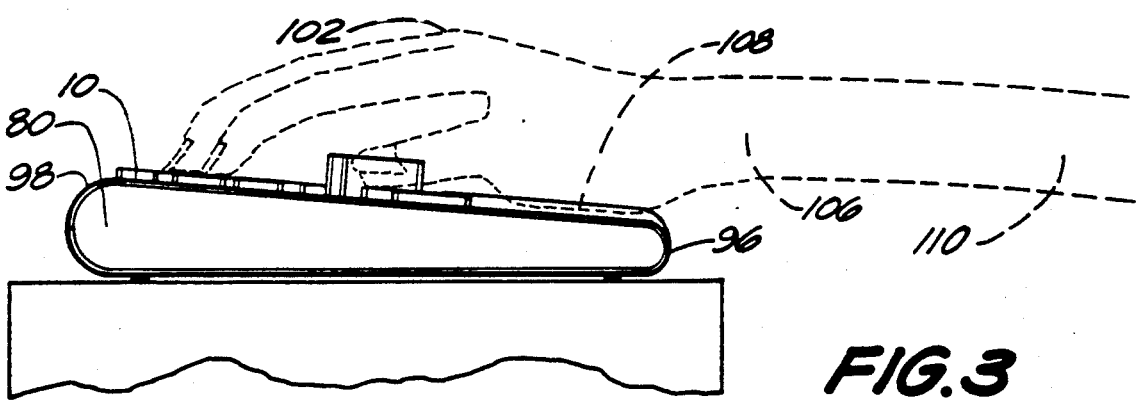
FIG. 3 is a side elevation view in the direction 3—3 indicated in FIG. 2 and showing the home position of the hands and fingers when the keyboard is in use.

Turning now to the drawings, wherein the same reference numeral denotes the same part throughout, the layout of the keyboard is shown in FIG. 1. FIGS. 2 and 3 show the hands 100, 102 of the user in their proper relationship to the keyboard. FIG. 1 is a diagram of the face 10 of the keyboard.

Four left hand character keys 12, 14, 16, 18, four right hand character keys 20, 22, 24, 26, a left thumb key 28 and a right thumb key 30 are provided for use in typing the letters of the alphabet and the numerals. As suggested in FIG. 2, these are the "home keys" on which the thumbs and fingers normally rest. The method of using these home keys to input or to type the letters of the alphabet and the numerals will be described more fully below in connection with FIGS. 5 and 6. As seen in FIGS. 1 and 2, the home keys are elongated in the direction of the fingers to accommodate hands of various sizes.

Immediately to the right of the left thumb key 28 there is provided a MATH key 32 with its locking key 36. Immediately to the left of the right thumb key 30 there is provided a CONTROL key 34 with its locking key 38. The keys 32 and 34 are mode-changing keys. For example, when the MATH key 32 is depressed, the home keys will input numerals instead of letters, as will be described in connection with FIG. 6 below. The locking keys 36, 38 perpetuate the actuation of the MATH key 32 and the CONTROL key 34, respectively. Indicator lamps 37, 39 associated with the keys 36, 38 provide a visual indication of when the MATH mode or the CONTROL mode has been locked in. The keys 32 and 36 are interconnected by a latch-release mechanism of the type used in conventional typewriters for the SHIFT and SHIFT-LOCK functions. This mechanism permits the MATH mode to be unlocked by depression of the MATH key 32. A similar mechanism is provided for the CONTROL key 34.

Punctuation keys 44, 46, 48, 50, 52, 54, 56 and 58, 60, 62, 64, 66, 68, and 70 are located immdiately adjacent but spaced distally from the finger keys 12, 14, 16, 18, and 20, 22, 24, and 26, respectively. The punctuation keys produce exactly the same characters regardless of whether the keyboard is inputting upper case or lower case characters, and regardless of whether the keyboard is in the MATH mode or the CONTROL mode.

A next line return key 72 is located adjacent the smallest finger of the right hand, and a key 74 is provided adjacent the smallest finger of the left hand to return the cursor or writing position to the upper left hand corner of the field.

An ENTER button 40 and a PRINT button 42 are provided. These permit the text being input to be transferred to a memory device or to be printed, respectively.

Two columns 86, 88 of keys are provided in the center of the keyboard. These are used in the preferred embodiment for commanding various functions. The proximal keys in the columns 86, 88 are located and contoured for use by the thumbs, as shown in FIG. 2. These keys can be reached by the thumbs without having to remove the fingers from the home keys. In the preferred embodiment, some of the center keys are used for setting the tabs.

One of the most striking features of the present invention is the combination and operation of the four keys 76, 78, 82, and 84.

As best seen in FIG. 1, the key 76 is located immediately adjacent the left side of the left thumb. The key 76 is connected to the body of the keyboard in such a way that it is depressable perpendicularly into the face of the keyboard in its normal position and so that it can also be slid to the left from its normal position shown in FIG. 1 when not depressed, but cannot simultaneously be depressed and slid to the left.

The key 84 is the symmetrical counterpart of the key 76. The key 84 is located adjacent the right side of the right thumb and is both depressable and slidable to the right (but not both simultaneously) similarly to the key 76.

The key 78 is located distally of the tip of the left thumb and adjacent thereto. The key 78 is depressable into the face of the keyboard and also is slidable distally as indicated by the arrow in FIG. 1. However, the key 78 cannot be depressed and slid simultaneously.

The key 82 is the symmetrical counterpart of the key 78 and it is slidable in the direction of the arrow shown in FIG. 1 and is depressable (but not both simultaneously).

Depression of the key 78 initiates execution of the TAB LEFT function, which moves the writing position or cursor to the left, to the nearest tab setting.

Depression of the key 82 initiates execution of the TAB RIGHT function, which moves the writing position or cursor to the right, to the nearest tab setting.

The four keys 76, 78, 82, and 84 provide a means for altering the writing position or cursor position relative to the medium. The placement of these keys and their directions of movement makes the writing position or cursor control easy to learn and to use because the directions in which the keys are moved correspond (with one exception) respectively to the directions in which the writing position or cursor moves.

The cursor or writing position is moved to the left simply by using the thumb of the left hand to slide the key 76 to the left. Similarly, the cursor or writing position is moved upward by using the tip of the left thumb to slide the key 78 in the distal direction.

The cursor or writing position may be moved to the right by using the right thumb to slide the key 84 to the right. Finally, the writing position or cursor is moved downwardly with respect to the medium when the key 82 is slid in the distal direction.

A single space is produced by sliding the key 84 momentarily to the right. A single backspace is produced by sliding the key 76 momentarily to the left.

The sliding motion of the keys 76, 78, 82, and 84 is opposed by a spring or other resilient means so that, when released, the key returns to its normal position shown in FIG. 1.

The keys 76, 78, 82, and 84 permit still other functions to be commanded. These functions are the ERASE LEFT and the ERASE RIGHT functions Because they result in the erasure of information, their use has purposefully been made to require some coordination so that their use must be deliberate rather than accidental. If the key 84 is depressed by the right thumb and simultaneously, the key 76 is slid to the left, the keyboard will produce a signal that commands the writing position or cursor to sweep to the left, erasing everything in its path.

Similarly, if the key 76 is depressed and simultaneously the key 84 is slid to the right, the keyboard will produce a signal to command the writing position or cursor to move to the right erasing everything in its path.

Figure 8:
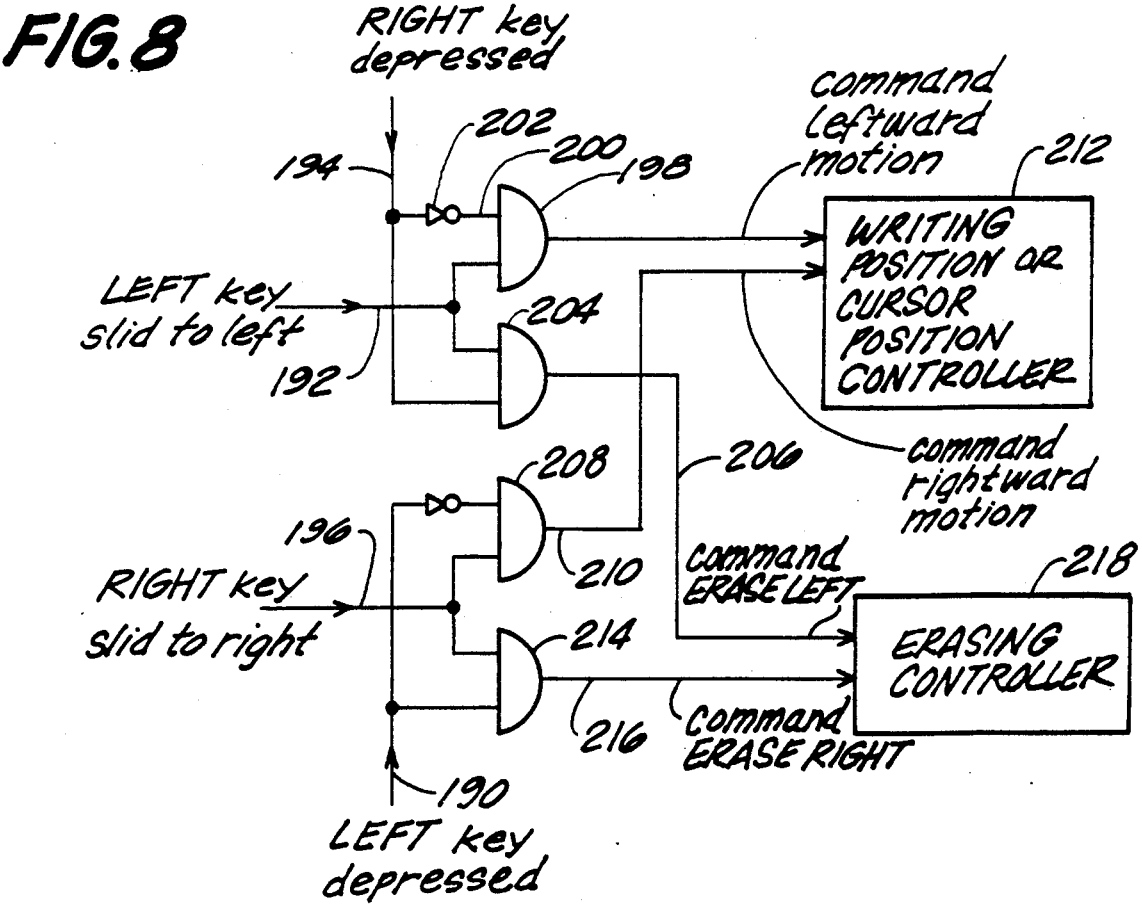

The means by which these erase functions are implemented in the preferred embodiment is shown in FIG. 8 and discussed in greater detail in connection with that figure.

In an alternative embodiment the ERASE LEFT function is effected simply by depressing the key 76, and the ERASE RIGHT function is effected simply by depressing the key 84.

Two palm pads 90, 92 are located near the proximal edge 96 of the keyboard on the right and left sides of it. These distinctive palm pads serve several useful purposes.

First, the palm pads 90, 92 are shaped and contoured to receive the proximal portion 108 of the palms of the hands and thereby to comfortably support the hands in the home position. As will be explained in connection with FIG. 4 below, the palm pads are preloaded upwardly so that they are not depressable accidentally, but, instead, must be deliberately depressed by the user.

In addition, the palm pads 90, 92 serve as the actuators for initiating and locking the SHIFT function, as will be explained in detail in connection with FIG. 8 below. It will be seen that when a character associated with a particular key is to be capitalized, the key and a palm pad may be struck by the same hand or by opposite hands as the user may choose. The indicator lamp 94 gives a visual indication when upper case characters are being used.

The contribution of the palm pads 90, 92 can hardly be overstated. The locations of the home keys with respect to the palm pads, as shown in FIG. 2, causes the hands of the user to be aligned with the arms, rather than to turn outwardly with respect to the arms, as is the usual situation with standard keyboards. The contouring of the surface of the palm pads 90, 92 encourages this natural position of the hands.

Further, by providing a comfortable and convenient rest for the proximal portions of the palms of the hands, the palm pads greatly reduce the strain on the user's body of having to hold the hands in an elevated position. Unlike certain doorknob-like structures sometimes found in prior art keyboards, which primarily supported the distal portion of the palm of the hand and thereby maintained the knuckles at a fixed height above the face of the keyboard, the palm pads of the present invention support the proximal portion of the palm of the hand and thereby permit the knuckles to move vertically in a natural and restful manner.

Also unlike certain wrist support structures known in the prior art, the palm pad of the present invention does not produce discomfort of the relatively uncushioned and closely ligamented wrist, but instead supports the hand on the relatively well padded and less sensitive proximal part of the palm, resulting in a much more comfortable and sustainable support.

As best seen in FIG. 3, the angle of inclination of the face 10 of the keyboard has been chosen in the preferred embodiment to be substantially equal to the inclination of the forearm 110 of the user, so that in use the wrist 106 need not be flexed upward or downward, again, to promote comfort during sustained operation.

Figure 4:
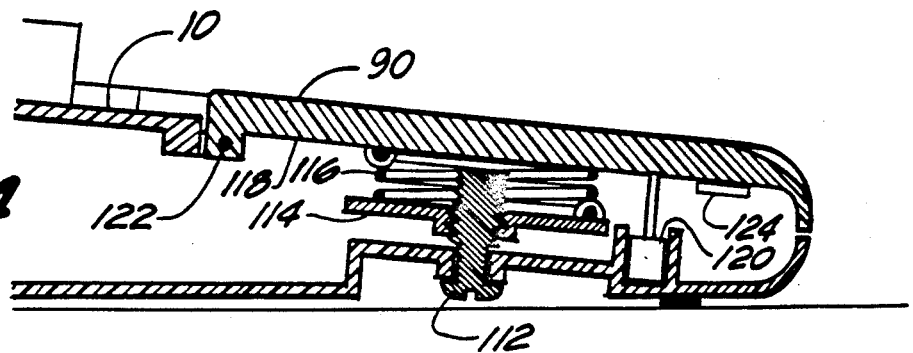
FIG. 4 is a mechanical diagram showing a side elevation view in the direction 4—4 indicated in FIG. 2.

FIG. 4 shows the mechanism that underlies the left palm pad 90 and that is used for preloading the palm pad and for adjusting the strength of the preloading force.

A screw 112 is used to alter the preloading force in the following manner. A plate-like nut 114, which is restrained from rotating moves axially along the screw as the screw is turned manually. A compression spring 116 is lodged between the plate-like nut 114 and the underside 118 of the palm pad, and exerts an upward force against the latter. The palm pad 90 is pivotally mounted to the body 80 of the keyboard and is prevented from rotating above its normal unactuated position by a mechanical stop 124. Thus, counter-clockwise rotation of the palm pad 90 about the hinge 122 is prevented by the stop 124, but when the user applies a sufficient downward force to the palm pad, that force will overcome the force with which the spring 116 pushes the palm pad against the stop 124, and thereby causes the palm pad to be rotated in the clockwise sense about the hinge 122 to a depressed position.

The user may adjust the preloading force by rotating the screw 112 until the palm pad has the desired degree of "stiffness". An electrical switch 120 is positioned beneath the palm pad and is actuated by mechanical displacement of the palm pad in a downward direction.

In a preferred embodiment of the invention, each of the keys (except for the keys 76, 78, 82, and 84) is associated with an electrical switch that is actuated by depressing the key.

In an alternative embodiment of the invention, capacitive proximity switches are used instead of the mechanically-actuated switches (except for the keys 76, 78, 82 and 84).

Regardless of the type of switches that are used, the closing of each switch applies an electrical signal, such as a preset voltage, to an electrical conductor (line) that is associated with the particular switch in question.

With this in mind, the manner in which the keyboard must be used to command the typing or printing of letter characters and numerals will now be discussed in connection with FIGS. 5 and 6.

Figure 5:
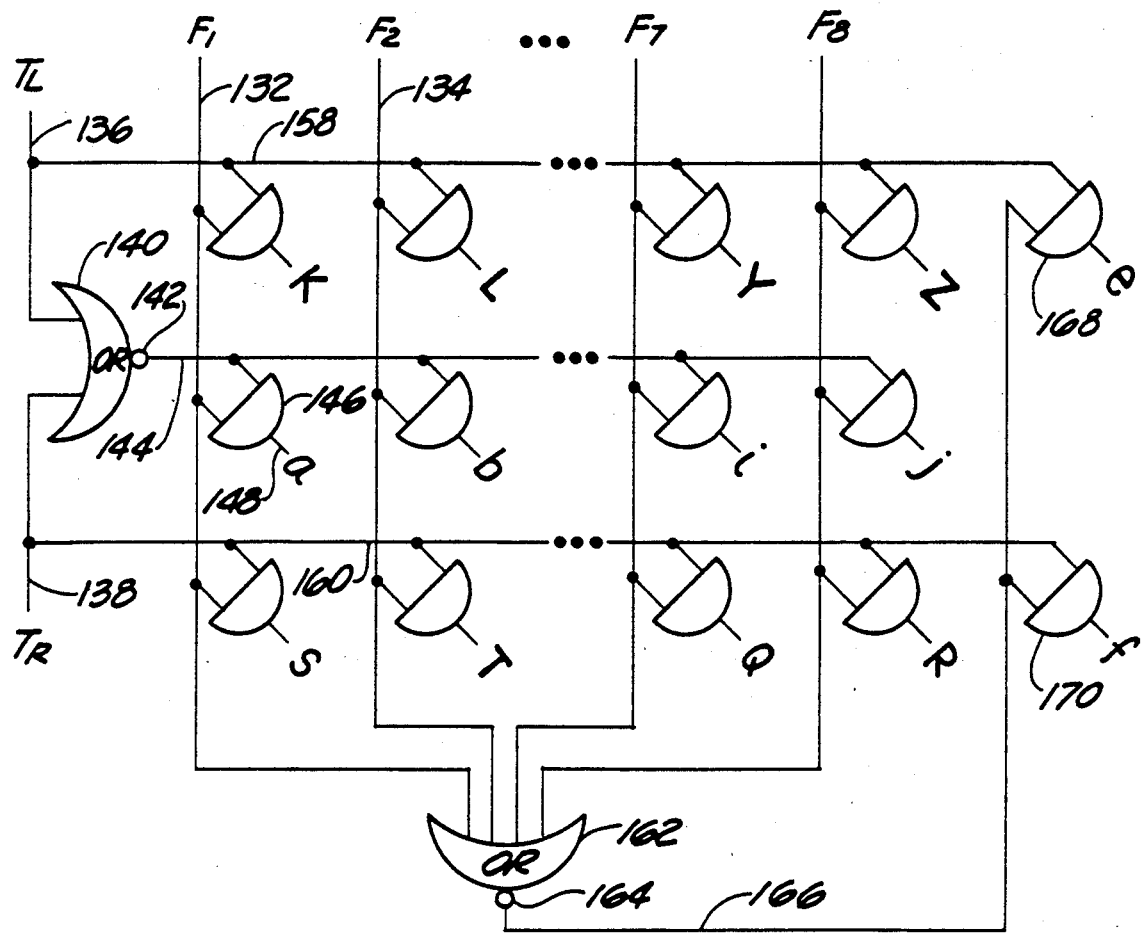
FIG. 5 is an electrical circuit diagram showing a logic circuit used in the preferred embodiment for controlling the printing or typing of the character keys.

In FIG. 5, the lines 132, 134 . . . are associated with the switches that are actuated by the fingers, $F_1$ through $F_8$, through the keys 12, 14, 16, 18, and 20, 22, 24, and 26. Similarly, the lines 136 and 138 are associated with switches that are actuated by the keys 28 and 30. Thus, at any particular time the lines 132, 134 . . . , and 136 and 138 conduct an electrical signal that has two possible states depending on whether the corresponding key is being struck. The states are normally referred to as "0" and "1" or as logical "high" and "low" states.

The lines 136, 138 are connected to the OR gate 140 which is followed by a logical inverter 142 so that a logical high signal is produced on the line 144 only when there is a logical high on either the line 136, or the line 138. In a preferred embodiment, the OR gate 140 is of a type known as exclusive OR, whose output remains low when signals are simultaneously applied on the lines 136, 138. Thus, the line 144 remains in the logical high state unless only one of the thumb keys 28, 30 is depressed.

If the finger key 12 is depressed by the finger $F_1$, and if neither thumb key is depressed, then both the line 132 and the line 144 are in logical high states, and the AND gate 146 produces a logical high output, denoted "a", on the line 148.

The MATH key 32 is connected in such a way that a logical high is present on the line 150 when the MATH key is not depressed, and a logical high is present on the line 152 when the MATH key is depressed. In one embodiment this is implemented by using two separate switches in association with the key 32.

Figure 6:
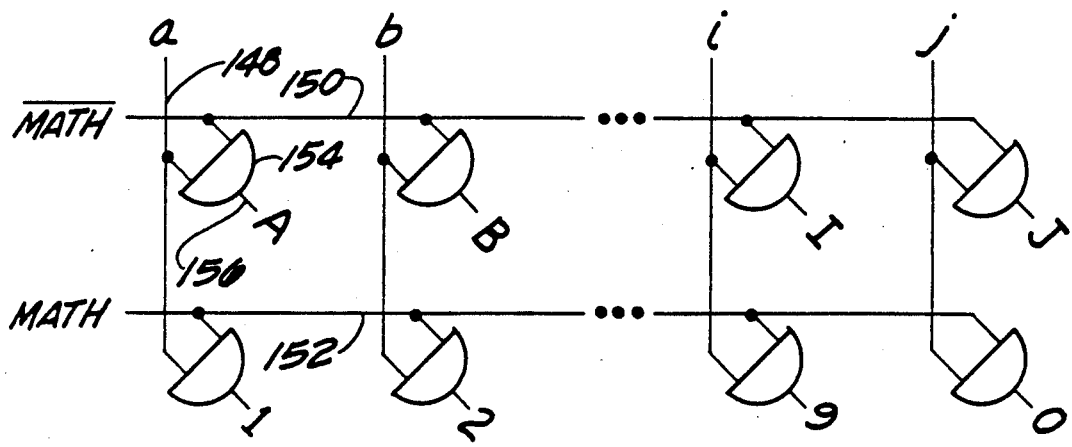
FIG. 6 is an electrical circuit diagram showing a logic circuit used in the preferred embodiment for effecting a mode change.

The line 148 of FIG. 6 is identical with the line 148 of FIG. 5, so that when the keyboard is not in the MATH mode and AND gate 154 produces a signal on the line 156 that controls the printing, or typing, or storing of the letter A.

Similar reasoning applies when only a single finger key is depressed, and it is in this manner that the typing or printing of the characters A, B, C, D, and G, H, I, and J is accomplished. Thus, a set of eight distinct characters are commanded by use of the fingers of the left and right hands used alone.

A second set of four characters, distinct from the first 8 are commanded by simultaneously depressing the left thumb key 28 and various ones of the left finger keys 12, 14, 16, and 18. In this case, the high logic state on the line 136 causes the signal on the line 144 to go to the low state. The signal on the line 158 of FIG. 5 when combined with a high signal on one of the lines 132, 134 . . . . enables the printing of the letters K, L, M, and N.

In like manner another set of four distinct characters are commanded by simultaneously depressing the right thumb key 30 and one of the right finger keys 20, 22, 24, and 26. In this case, there will be a high signal on the line 160, enabling the commanding of the letters O P, Q, and R as the finger keys 20, 22, 24, and 26 respectively are depressed.

A third set of four distinct characters are commanded by simultaneously depressing the right thumb key 30 and one of the four left finger keys 12, 14, 16, and 18. In this manner the letters S, T, U, and V are commanded.

Another set of four distinct characters are commanded by simultaneously depressing the left thumb key 28 and one of the right finger keys 20, 22, 24, and 26. In this way the characters W, X, Y, and Z are commanded.

Thus far, 24 distinct characters have been accounted for, and the two additional characters required to make up a 26-character alphabet are commanded by depressing, respectively, the left thumb key 28 alone, and the right thumb key 30 alone, to produce the characters E and F, respectively.

Referring to FIG. 5, if none of the finger keys corresponding to the fingers $F_1$ through $F_8$ is depressed, the signal on the line 166 remains high, enabling the AND gates 168, 170 to produce the characters e, and f, respectively when the left thumb key or the right thumb key is depressed.

In this way, the commanding of 26 distinct characters is accomplished. It is noteworthy that the chording scheme described here is independent of the indentities of the characters associated with the keys. The invention, in this aspect is seen to be far more profound than merely the particular assignment of characters to keys shown in FIG. 1, but instead is a chording scheme that comprehends all possible assignments of characters to keys.

As discussed above, the circuit of FIG. 6 permits the signals a, b, . . . i, j to be rendered as the letters A, B . . . . I, J or as the numerals 1, 2, . . . 9, 0 depending on whether the MATH key 32 is depressed. The MATH key 32 is an example of a mode-changing key that alters the identity of the characters commanded when particular combinations of keys are depressed.

Another example of a mode-changing key is the palm pads 90, 92 which are used for controlling the SHIFT function.

If it is desired to be able to command both upper case and lower case letters, then the output signals A, B, .. . Y, Z (the entire alphabet) can be input to a logic circuit similar to that of FIG. 6, whereby if a lower case state SHIFT is indicated, then the signals A through Z are routed to means for printing or storing lower case letters; but if the upper case signal SHIFT is present, the signals A through Z will be routed to means for printing or storing upper case letters.

Figure 7:
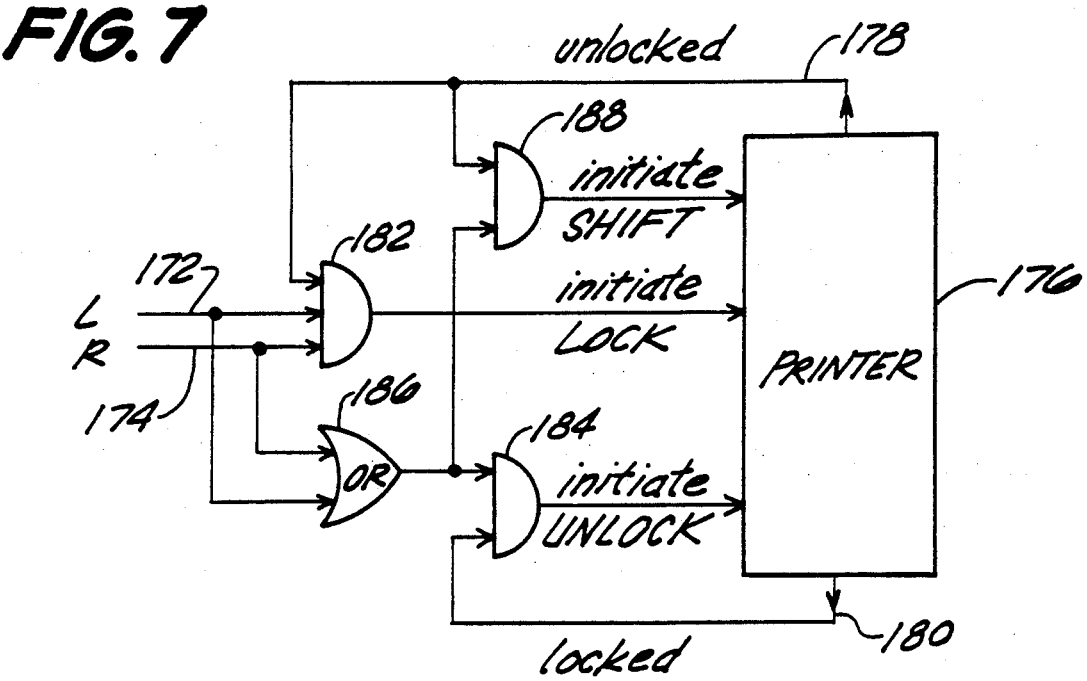
FIG. 7 is an electrical block diagram showing a logic circuit used in the preferred embodiment for controlling the SHIFT and SHIFT LOCK functions; and, FIG. 8 is an electrical block diagram showing a logic circuit used in the preferred embodiment for controlling the ERASE and the writing position movement functions.

FIG. 7 is a logic circuit diagram showing how the SHIFT function is implemented in accordance with the preferred embodiment. The line 172 is connected to the switch 120 of FIG. 4 that is actuated by the left palm pad 90. When the left palm pad is depressed, the signal on the line 172 goes from a logic low state to a logic high state. Similarly, the line 174 is connected to a switch comparable to the switch 120 and which is actuated by the right palm pad 92. The signal on the line 174 remains in the low state until the palm pad 92 is depressed, at which time the signal on the line 174 switches to the high state.

The apparatus which the keyboard is inputting characters to, labeled PRINTER 176 by way of example in FIG. 7, must provide some indication of what state it is in. In particular, it must provide feedback via the lines 178, 180, to indicate whether the shift function has been locked.

If the printer 176 is in the unlocked state, the AND gate 182 will initiate lock when both palm pads are depressed simultaneously.

On the other hand, if either (but not both) of the palm pads is depressed (as indicated by the output of the OR gate 186) when the printer 176 is locked (as indicated by the signal on the line 180), then the AND gate 184 will initiate unlocking of the SHIFT function.

It can further be seen that if the printer 176 is in the unlocked state, and either (but not both) of the palm pads is depressed, the AND gate 188 will initiate SHIFT.

Although the SHIFT function was used by way of example of the control of a two-valued function by means of the palm pads 90, 92, it is clear that some other twovalued function could alternatively be controlled through the use of the palm pads.

FIG. 8 is a logic circuit diagram describing yet another novel and useful feature of the keyboard of the present invention. FIG. 8 relates to the operation of the thumb-operated keys 76 and 84 shown in FIG. 1. It will be recalled that these keys are slidably laterally in the directions shown by the arrows in FIG. 1 and in addition, each key is depressable perpendicularly into the face 10 of the keyboard.

Corresponding to the two possible motions of each key, there are two input lines shown in FIG. 8. Thus, when the key 76 is depressed, a logic high signal appears on the line 190, and when the key 76 is slid to the left, a logic high signal appears on the line 192. The mechanical structure of the key 76 prevents it from being simultaneously depressed and being slid to the left. Similarly, when the key 84 is depressed, a logic high appears on the line 194, and when the key 84 is slid to the right, a logic high appears on the line 196. The keys 76 and 84 can be operated independently and simultaneously.

If the left key 76 is slid to the left, and the right key 84 is not touched, the AND gate 198 will produce a logic high output that serves as a signal to command leftward motion of the writing position, since the logic low on the line 194 is converted to a logic high on the line 200 by the logical inverter 202. On the other hand, if the left key 76 is slid to the left and simultaneously the right key 84 is depressed, the logic inverter 202 will inhibit the leftward motion command, and the AND gate 204 will produce a logic high on the line 206, which is used as a command for the operation ERASE LEFT. That command results in the writing position sweeping to the left and erasing everything in its path.

In a symmetrical manner, if the right key 84 is slid to the right and the left key is left untouched, the AND gate 208 will produce a logic high signal on the line 210 that is fed to the writing position controller 212 to command rightward motion of the writing position. However, if the right key 84 is slid to the right and simultaneously, the left key 76 is depressed, then the AND gate 214 produces a logic high on the line 216, which is applied to the erasing controller 218 to command the ERASE RIGHT function. This function causes the writing position to sweep in a rightward direction erasing everything in its path.

It will be appreciated that the writing position controlled by the controller 212 may be an actual physical position, as would be the case if the keyboard were used with a typewriter or printer, or alternatively, the writing position may be indicated by the position of a cursor that is displayed on a CRT. Similarly, it can be appreciated that the erasing accomplished by the erasing controller 218 may be an actual physical operation, such as would be performed by an erasing typewriter to which the keyboard might be connected, or alternatively, the erasing may be merely the alteration of data previously stored in a storage device or memory.

As pointed out above, the keyboard described herein is not merely a part of a typewriter, for example, but instead is intended to be usable with other types of equipment as well, such as (without limitation) typewriters, word processors, printers, teletype transmitters and computers.

Thus, there has been described a keyboard that has a number of novel features. The features involve the placement of the keys and the manner of operating them to control the inputting of characters into another apparatus such as a printer or a memory. All of the features of the keyboard have the purpose of making a keyboard easier to use and to learn. The keyboard is designed to take advantage of the strengths of the human hand and to circumvent its weakness.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A keyboard comprising:
   a body;
   home keys attached to said body and on which the fingers of the user normally remain;
   actuating means for mode changing, attached to said body and operable while the fingers remain on said home keys, and that when actuated alter the mode of the keyboard by assigning an alternative set of characters to said home keys; and,
   punctuation keys attached to said body and that produce characters that remain unchanged regardless of which mode the keyboard is in.

2. The keyboard of claim 1 wherein said punctuation keys are located distally of but immediately adjacent said home keys, whereby an individual punctuation key can be struck by a finger without the user having to remove the remaining fingers from their home keys.

3. A keyboard that eliminates the wristtwist that is common with thumb-ball supports and that eliminates the uncomfortable pressure on the wrist that is common with wrist supports, said keyboard comprising:
   a body;
   a palm pad attached to said body, and shaped like the proximal part of the palm of a hand, contoured to conform to the surface of the proximal part of the palm of the hand, and relieved at its proximal edge to accommodate the wrist without exerting pressure on the wrist.

4. A keyboard comprising:
   a body;
   a palm pad attached to said body; and,
   means connecting said palm pad to said body for preloading said palm pad to support the weight of a user's forearm and hand, said palm pad depressable to an activated position by the user against the urging of said means for preloading.

5. The keyboard of claim 4 wherein said means further comprise means for adjusting the preloading force.

6. A keyboard comprising:
   a body;
   a set of keys mounted to said body and defining home positions for the fingers of the left and right hands;
   a CURSOR LEFT key mounted to said body adjacent the left side of the left thumb when the fingers are in their home positions and actuatable by leftward movement of the left thumb for the purpose of effectuating leftward motion of a cursor;
   a CURSOR UP key mounted to said body adjacent the tip of the left thumb when the fingers are in their home positions and actuatable by distal movement of the left thumb for the purpose of effectuating upward motion of the cursor;

a CURSOR RIGHT key mounted to said body adjacent the right side of the right thumb when the fingers are in their home positions and actuatable by rightward movement of the right thumb for the purpose of effectuating rightward motion of the cursor; and, a CURSOR DOWN key mounted to said body adjacent the tip of the right thumb when the fingers are in their home positions and actuatable by distal movement of the right thumb for the purpose of effectuating downward motion of the cursor.

7. The keyboard of claim 6 wherein said CURSOR UP key is also depressable by the user for the purpose of effectuating a function.

8. The keyboard of claim 7 wherein said function is the TAB LEFT function.

9. The keyboard of claim 6 wherein said CURSOR DOWN key is also depressable by the user for the purpose of effectuating a function.

10. The keyboard of claim 9 wherein said function is the TAB RIGHT function.

11. The keyboard of claim 6 wherein said CURSOR LEFT key is also depressable by the user for the purpose of effectuating a function.

12. The keyboard of claim 11 wherein said function is the ERASE LEFT function.

13. The keyboard of claim 6 wherein said CURSOR RIGHT key is also depressable by the user for the purpose of effectuating a function.

14. The keyboard of claim 13 wherein said function is the ERASE RIGHT function.

15. The keyboard of claim 6 wherein said CURSOR LEFT key is also depressable and wherein when said CURSOR LEFT key is depressed and simultaneously said CURSOR RIGHT key is actuated by the user, a function is effectuated.

16. The keyboard of claim 15 wherein the function is the ERASE RIGHT function.

17. The keyboard of claim 6 wherein said CURSOR RIGHT key is also depressable and wherein when said CURSOR RIGHT key is depressed and simultaneously said CURSOR LEFT key is actuated by the user, a function is effectuated.

18. The keyboard of claim 17 wherein the function is the ERASE LEFT function.

19. A keyboard comprising:
a body;
a set of keys mounted to said body and defining home positions for the fingers of the left and right hands;
a LEFT key mounted to said body adjacent the left side of the left thumb when the fingers are in their home positions and actuatable by leftward movement of the left thumb for the purpose of effectuating leftward motion of a writing position;
an UP key mounted to said body adjacent the tip of the left thumb when the fingers are in their home positions and actuatable by distal movement of the left thumb for the purpose of effectuating upward motion of the writing position;
a RIGHT key mounted to said body adjacent the right side of the right thumb when the fingers are in their home positions and actuatable by rightward movement of the right thumb for the purpose of effectuating rightward motion of the writing position; and,
a DOWN key mounted to said body adjacent the tip of the right thumb when the fingers are in their home positions and actuatable by distal movement of the right thumb for the purpose of effectuating downward motion of the writing position.

20. The keyboard of claim 19 wherein said UP key is also depressable by the user for the purpose of effectuating a function.

21. The keyboard of claim 20 wherein said function is the TAB LEFT function.

22. The keyboard of claim 19 wherein said DOWN key is also depressable by the user for the purpose of effectuating a function.

23. The keyboard of claim 22 wherein said function is the TAB RIGHT function.

24. The keyboard of claim 19 wherein said LEFT key is also depressable by the user for the purpose of effectuating a function.

25. The keyboard of claim 24 wherein said function is the ERASE LEFT function.

26. The keyboard of claim 19 wherein said RIGHT key is also depressable by the user for the purpose of effectuating a function.

27. The keyboard of claim 26 wherein said function is the ERASE RIGHT function.

28. The keyboard of claim 19 wherein said LEFT key is also depressable and wherein when said LEFT key is depressed and simultaneously said RIGHT key is actuated by the user, a function is effectuated.

29. The keyboard of claim 28 wherein the function is the ERASE RIGHT function.

30. The keyboard of claim 19 wherein said RIGHT key is also depressable and wherein when said RIGHT key is depressed and simultaneously said LEFT key is actuated by the user, a function is effectuated.

31. The keyboard of claim 30 wherein the function is the ERASE LEFT function.

32. A keyboard that permits a user to select the state (OFF or ON) of a two-valued variable and optionally to perpetuate the chosen state for as long as desired, said keyboard comprising in combination:
a body;
a left palm pad attached to said body and selectively depressable by the user;
a right palm pad attached to said body and selectively depressable by the user;
switching and logic means electrically connected to said left palm pad and to said right palm pad, and responsive when the variable is in the OFF state to depression of either palm pad to produce an ON output signal of limited duration, and responsive when the variable is in the OFF state to depression of both palm pads approximately simultaneously to produce and perpetuate the ON output signal, and responsive when the variable is in the perpetuated ON state to depression of either palm pad to produce and perpetuate the OFF output signal.

33. The keyboard of claim 32 wherein the two-valued variable is the SHIFT function.

34. A keyboard that permits a user to type a set of 26 different characters, comprising:
a body;
four left finger keys attached to said body and selectively depressable by the user;
four right finger keys attached to said body and selectively depressable by the user;
a left thumb key attached to said body and selectively depressable by the user;

a right thumb key attached to said body and selectively depressable by the user;

first means responsive to depression of only one of said four left finger keys to type, respectively, four distinct characters that make up a first subset;

second means responsive to substantially simultaneous depression of said left thumb key and one of said four left finger keys to type, respectively, four distinct characters that make up a second subset;

third means responsive to substantially simultaneous depression of said right thumb key and one of said four left finger keys to type, respectively, four distinct characters that make up a third subset;

fourth means responsive to depression of only one of said four right finger keys to type, respectively, four distinct characters that make up a fourth subset;

fifth means responsive to substantially simultaneous depression of said right thumb key and one of said four right finger keys to type, respectively, four distinct characters that make up a fifth subset;

sixth means responsive to substantially simultaneous depression of said left thumb key and one of said four right finger keys to type, respectively, four distinct characters that make up a sixth subset;

seventh means responsive to depression of only said left thumb key to type a distinct character; and, eighth means responsive to depression of only said right thumb key to type a distinct character.

35. A method of typing a set of 26 different characters comprising the steps of:

typing a first subset of ten characters using respectively the eight fingers and the thumbs of the left and right hands;

typing a second subset of four characters by using respectively the four fingers of the left hand and with each simultaneously using the thumb of the left hand;

typing a third subset of four characters by using respectively the four fingers of the right hand and with each simultaneously using the thumb of the right hand;

typing a fourth subset of four characters by using respectively the four fingers of the left hand and with each simultaneously using the thumb of the right hand; and typing a fifth subset of four characters by using respectively the four fingers of the right hand and with each simultaneously using the thumb of the left hand.

* * * * *